(12) United States Patent
Brown et al.

(10) Patent No.: US 8,146,992 B2
(45) Date of Patent: Apr. 3, 2012

(54) TURRET SEAT

(75) Inventors: Christopher Allen Brown, Bloomington, IN (US); Matthew Juhl, Springville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 381 days.

(21) Appl. No.: 12/510,221

(22) Filed: Jul. 27, 2009

(65) Prior Publication Data
US 2011/0018319 A1    Jan. 27, 2011

(51) Int. Cl.
*A47C 1/00* (2006.01)
(52) U.S. Cl. ............. 297/344.21; 297/344.23; 297/273
(58) Field of Classification Search ............. 297/344.21, 297/344.23, 273
See application file for complete search history.

(56) References Cited

U.S. PATENT DOCUMENTS

| | | | |
|---|---|---|---|
| 1,688,922 A * | 10/1928 | Drinosky ................. | 280/87.051 |
| 1,700,902 A | 2/1929 | Le Prieur | |
| 2,335,286 A * | 11/1943 | Corte et al. ................. | 89/37.17 |
| 2,345,504 A | 3/1944 | Scott-Paine | |
| 2,356,152 A | 8/1944 | Edwards et al. | |
| 2,358,105 A | 9/1944 | Scott-Paine | |
| 2,415,967 A | 2/1947 | Pontius, III | |
| 2,569,571 A | 10/1951 | Newell et al. | |
| 2,712,348 A | 7/1955 | Cooper | |
| 2,812,012 A | 11/1957 | Hansburg | |
| 3,625,563 A | 12/1971 | Dickinson | |
| 3,778,052 A * | 12/1973 | Andow et al. ............ | 280/87.041 |
| 3,954,041 A | 5/1976 | Mechulam et al. | |
| 4,008,500 A | 2/1977 | Hall, Jr. | |
| 4,743,008 A * | 5/1988 | Fermaglich et al. ............ | 482/54 |
| 5,148,152 A | 9/1992 | Stueckle et al. | |
| 5,194,311 A * | 3/1993 | Baymak et al. ............... | 428/116 |
| 5,526,893 A * | 6/1996 | Higer ............................ | 180/65.1 |
| 5,704,882 A * | 1/1998 | Coates et al. ................... | 482/69 |
| 6,089,652 A | 7/2000 | Miller, Sr. | |
| 6,375,599 B1 | 4/2002 | Brown | |
| 7,030,579 B1 | 4/2006 | Schmitz et al. | |
| 7,059,680 B2 | 6/2006 | Billger et al. | |
| 7,175,233 B2 | 2/2007 | Greenwood et al. | |
| 7,175,535 B1 * | 2/2007 | Marmentini ................... | 472/118 |
| 7,234,561 B2 | 6/2007 | Hock et al. | |
| 7,350,866 B2 | 4/2008 | Billger et al. | |
| 7,416,247 B2 * | 8/2008 | Dunneback et al. .......... | 296/219 |
| 7,815,255 B1 * | 10/2010 | Kiel et al. .................. | 297/216.1 |
| 7,988,237 B2 * | 8/2011 | Peters ........................ | 297/463.2 |

OTHER PUBLICATIONS

Brown, Robert, "Star Wars, The Millennium Falcon, Gun Turrets—artificial gravity and bent space," © 1998, 5 pgs., downloaded Jul. 21, 2009 from http://web.archive.org/web/20021206032222/www.synicon.com.au/sw/mf/turret.htm.

Linemaster Switch Corporation, Varior Foot Switch LIT-006 Rev. B, 2 pgs., at least as early as Jun. 16, 2009, Woodstock, CT.

Simpson Racing web page, "Latch & Link Quarter Midget Assembly," 1 pg., downloaded Jul. 29, 2009 from http://www.simpsonraceproducts.com/products/index.php?main_page=product_info&cPath=344.

(Continued)

*Primary Examiner* — Sarah B McPartlin
(74) *Attorney, Agent, or Firm* — Christopher A. Monsey

(57) ABSTRACT

An operator support assembly supported for rotation. The operator support assembly includes a seat bottom suspended below a rotatable member and a support coupling the seat bottom to the rotatable member. The support illustratively includes a shock absorbing device to dampen shock impulse between the rotatable member and the seat bottom. A quick release mechanism may be provided to cause the seat bottom to pivot downwardly about a pivot coupler.

39 Claims, 16 Drawing Sheets

OTHER PUBLICATIONS

Simpson Racing web page, "Latch & Link Sprint Car Assembly," 1 pg., downloaded Jul. 29, 2009 from http://www.simpsonraceproducts.com/products/index.php?main_page=product_info&cPath=344.

Tenneco Marzocchi S.r.l. web page, "Aftermarket shocks," 1 pg., downloaded Jul. 29, 2009 from http://www.marzocchi.com/Template/listSPAShocksMTB.asp?IDFolder=552&IDAnno.

* cited by examiner

TURRET SEAT

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY OF THE DISCLOSURE

The present invention relates generally to operator supports and, more particularly, to a seat assembly supported by a rotatable turret.

Structures are known for supporting an operator below a rotating support. For example, vehicles including turrets may include a flexible strap coupled below a rotatable ring at diametrically opposed support points. However, such straps often prove to be uncomfortable for the operator, particularly during extended periods of time. Additionally, such straps provide little protection to the operator in the event of an accident, or due to blast pressures or fragmentation due to blast events. Further, such straps provide little or no cushioning from vibrations and impacts during normal vehicle operations.

According to an illustrative embodiment of the present disclosure, an operator support assembly includes a first member, and a second member supported for rotation relative to the first member, the second member defining a center opening. A seat bottom is suspended below the second member. A support couples the seat bottom to the second member. The support includes a shock absorbing device to dampen shock impulse between the second member and the seat bottom.

In a further illustrative embodiment, the support includes a first support member and a second support member, a releasable coupling connecting the first support member to the seat bottom, and a pivotable coupling connecting the second support member to the seat bottom. A quick release mechanism includes a user interface operably coupled to the releasable coupling, wherein activation of the user interface causes the quick release mechanism to disconnect the releasable coupling from the seat bottom such that the seat bottom pivots downwardly about the pivotable coupling.

According to another illustrative embodiment of the present disclosure, a method of supporting an individual within a turret includes the steps of providing a rotatable member, and suspending a seat bottom from the rotatable member, the seat bottom including a rigid base member. The method further includes the steps of absorbing shock between the rotatable member and the seat bottom, and rotating simultaneously the rotatable member and the seat bottom.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
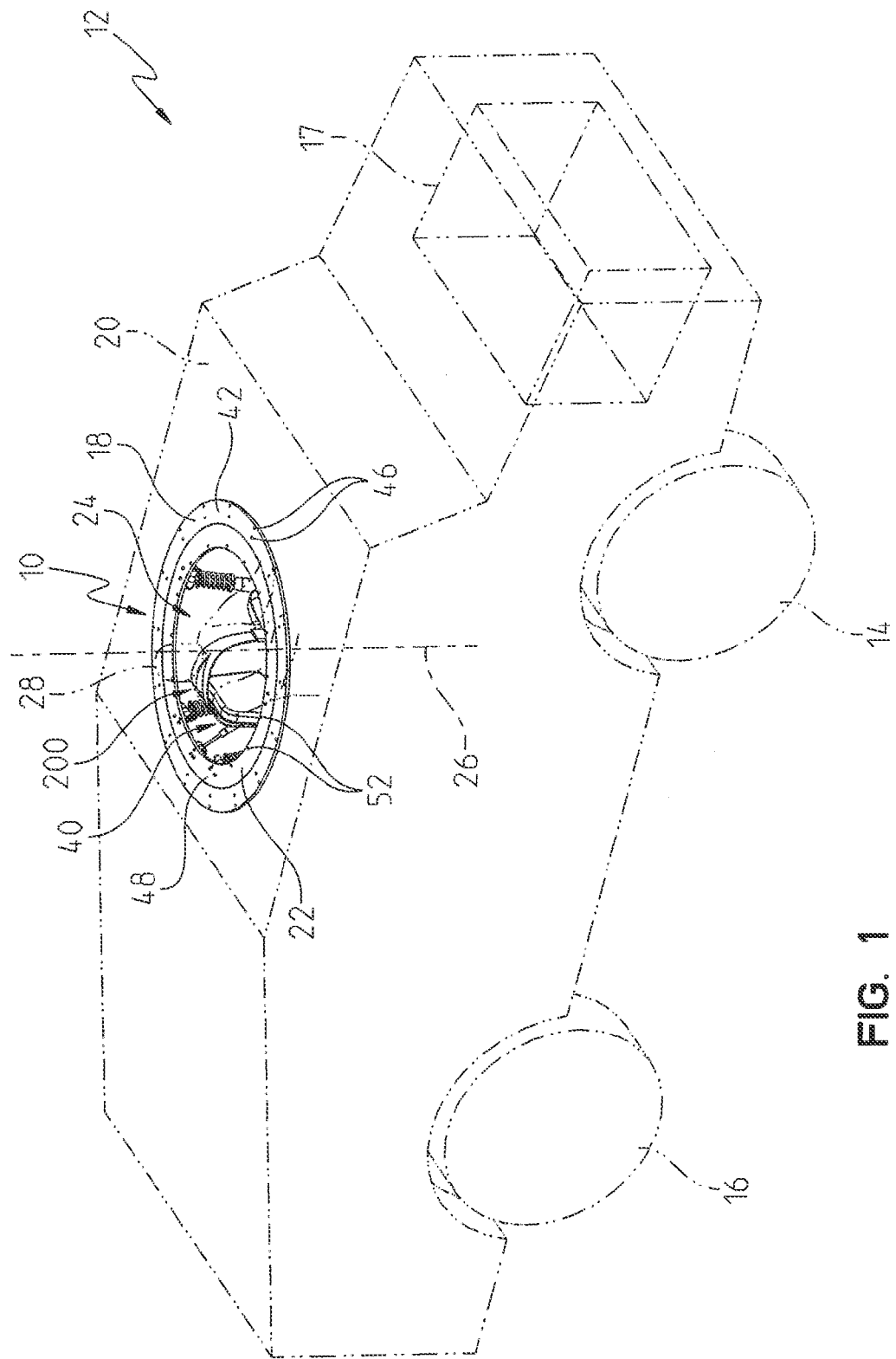
FIG. 1 is a perspective view of an illustrative operator support assembly coupled to a vehicle.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIG. 1, operator support assembly 10 according to an illustrative embodiment of the present disclosure is shown coupled to a vehicle 12. Illustratively, the vehicle 12 includes a plurality of ground engaging members, such as a pair of front wheels 14 and a pair of rear wheels 16. Some or all of the wheels 14 and 16 may be driven in motion by an actuator, such as an engine 17. While the following description describes the operator support assembly 10 for use in connection with a vehicle 12, it should be appreciated that the operator support assembly 10 may find use in other applications, including being mounted to a stationary support (not shown). Further, the illustrative vehicle 12 in the embodiment of FIG. 1 may be of any conventional type, such as military vehicles, law enforcement vehicles, rescue trucks, communications vehicles, material handling equipment, and construction equipment.

With reference to FIGS. 1-7, the operator support assembly 10 illustratively includes a first member, such as an annular outer stationary member 18 configured to be coupled to a base 20, such as a vehicle platform. A second member, such as an annular inner rotatable member 22, is illustratively supported for rotation relative to the stationary member 18 and is concentrically received within the outer stationary member 18. The inner rotatable member 22 defines a center opening 24 having a longitudinal axis 26 and configured to receive the torso of an individual 28, typically an operator associated with the vehicle 12 (FIG. 1). More particularly, the center opening 24 of the rotatable member 22 is configured to permit the traversing thereof by the torso of individual 28 (i.e., ingress and egress within the center opening 24). Illustratively, the center opening 24 has an inner diameter D (FIG. 6) of at least 26 inches based upon the shoulder width of an average adult male. In one illustrative embodiment, the inner diameter D of center opening 24 is approximately 42 inches in order to accommodate the clothing of individual 28 and to permit the manipulation of equipment within opening 24 by individual 28.

Figure 7:
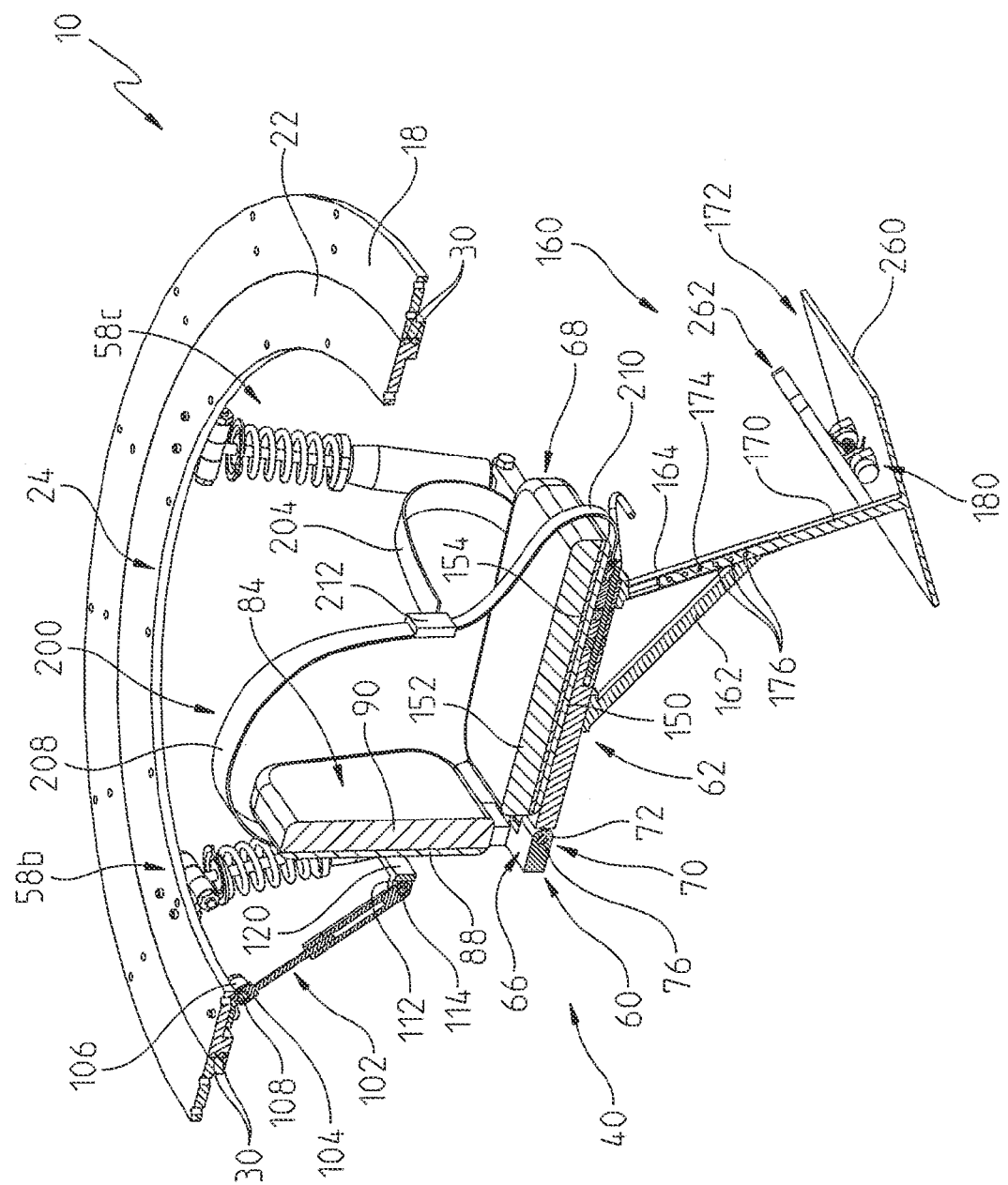
FIG. 7 is a side perspective view, in cross-section, of the operator support assembly of FIG. 2.
Figure 8:
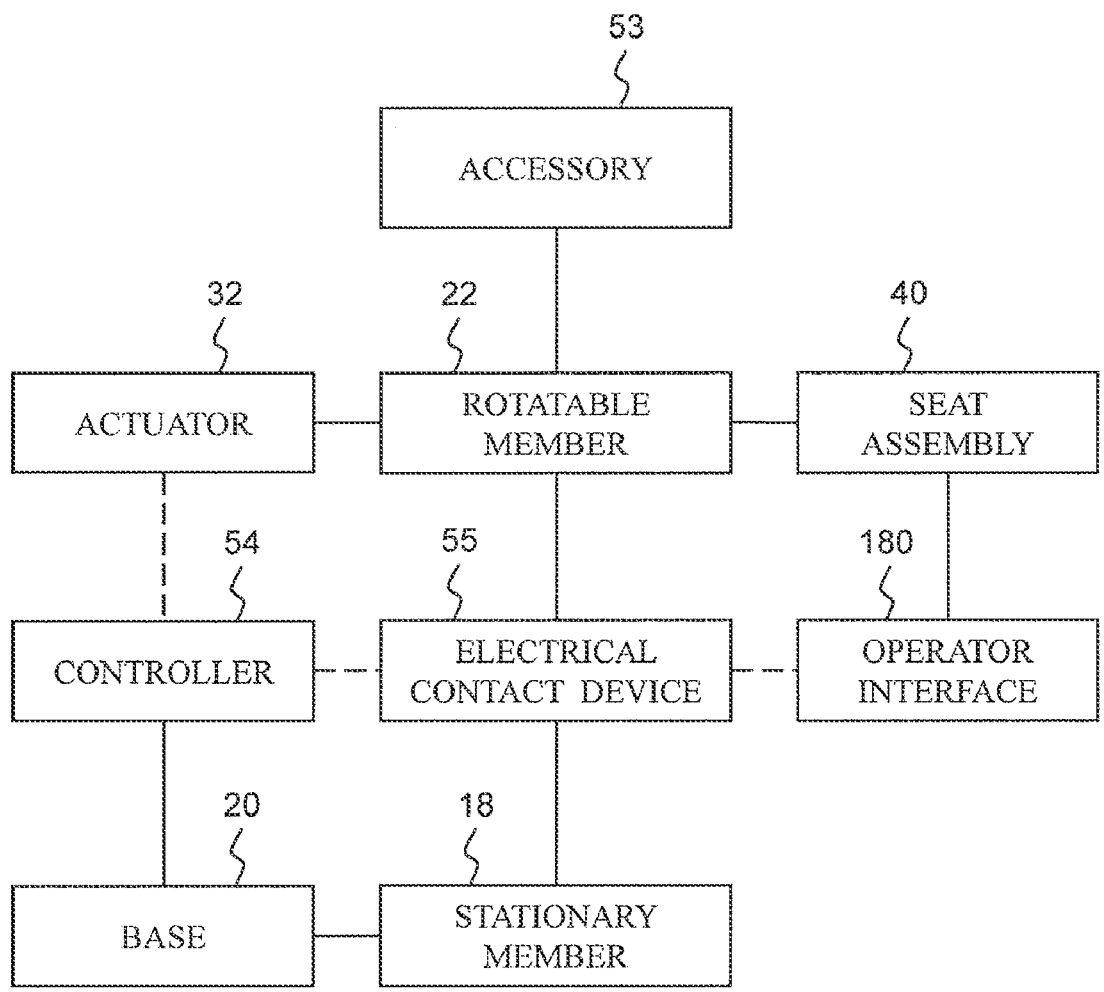
FIG. 8 is a block diagram illustrating the interaction between the operator interface and additional components of the operator support assembly of FIG. 2.

With reference to FIG. 8, an actuator 32, such as an electric motor connected to a gear train, may be coupled in a conventional manner to drive the rotatable member 22 in rotation relative to the stationary member 18. In another embodiment, a manual hand crank (not shown) may be coupled to the rotatable member 22, wherein rotation of the hand crank drives the rotatable member 22 in rotation. Alternatively, the rotatable member 22 may be manually rotated by the individual 28 received within the center opening 24 by pushing his or her legs against the floor or other relatively stationary member. As further detailed herein, an operator seat assembly 40 is illustratively supported by the rotatable member 22, such that the individual 28 supported by the seat assembly 40 rotates concurrently with the rotatable member 22. Conventional bearing members, such as ball bearings 30 (FIG. 7), are illustratively supported intermediate the stationary member 18 and the rotatable member 22 to facilitate relative rotation therebetween.

The stationary member 18 includes an annular outer mounting flange 42 having a plurality of mounting holes 44 for receiving fasteners 46 for coupling to the vehicle platform or base 20 (FIG. 1). Similarly, the rotatable member 22 includes an annular inner mounting flange 48 having a plurality of mounting holes 50 for receiving fasteners 52 for securing thereto an accessory 53 (FIG. 8), such as a turret in connection with a military vehicle, an antenna or camera in connection with a communications vehicle, a crane in connection with construction equipment, a ladder in connection with rescue or maintenance trucks, or a water cannon for use on fire fighting or crowd control vehicles.

With further reference to FIG. 8, a controller 54 may be supported by the base 20 and is in electrical communication with an electrical contact device 55. The electrical contact device 55 provides for electrical communication between components coupled to the stationary member 18 and components coupled to the rotatable member 22. An illustrative electrical contact device 55 is disclosed in U.S. patent application Ser. No. 12/334,070, filed Dec. 12, 2008, the disclosure of which is expressly incorporated by reference herein.

Figure 2:
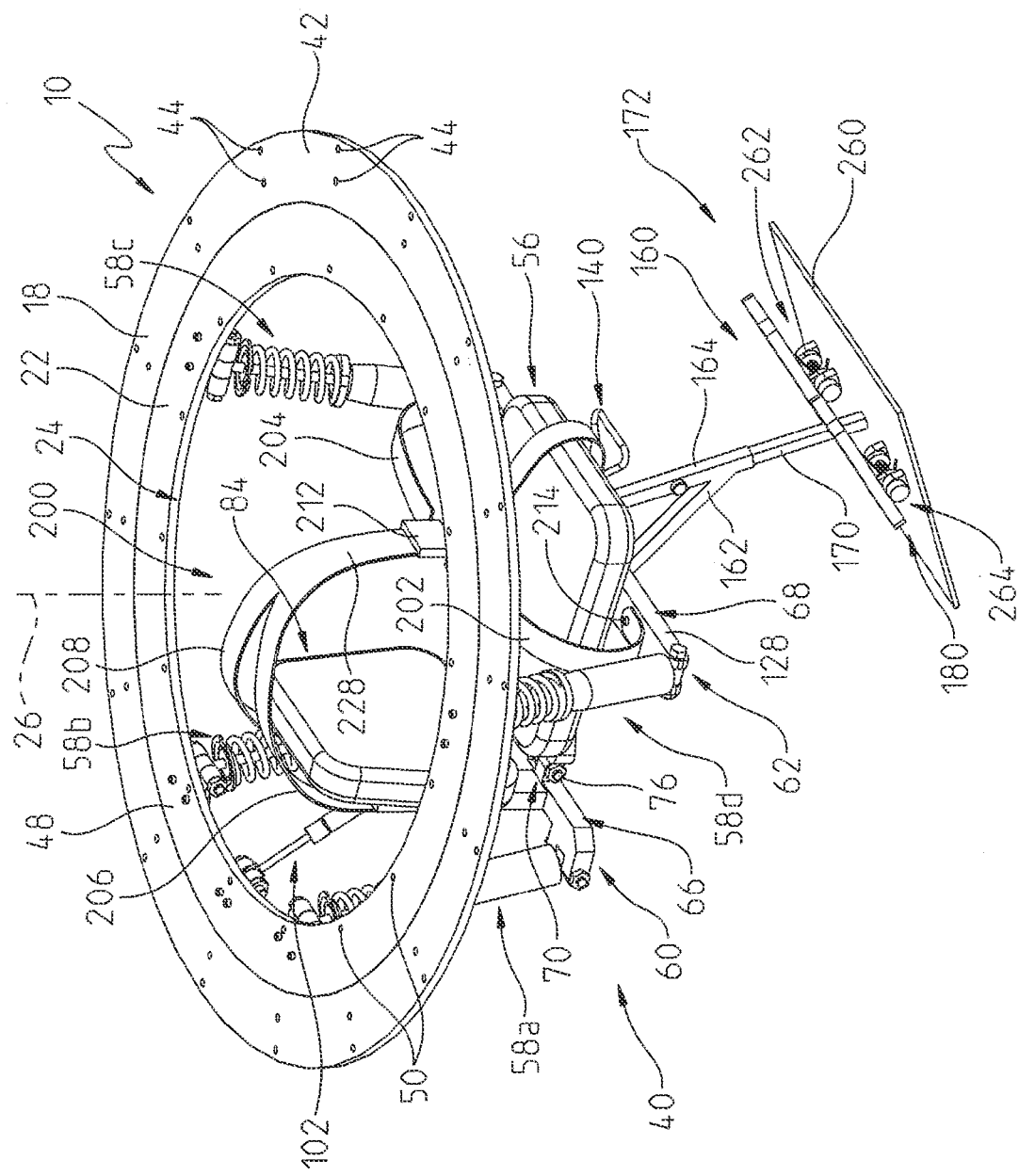
FIG. 2 is a front, top perspective view of the operator support assembly of FIG. 1.
Figure 3:
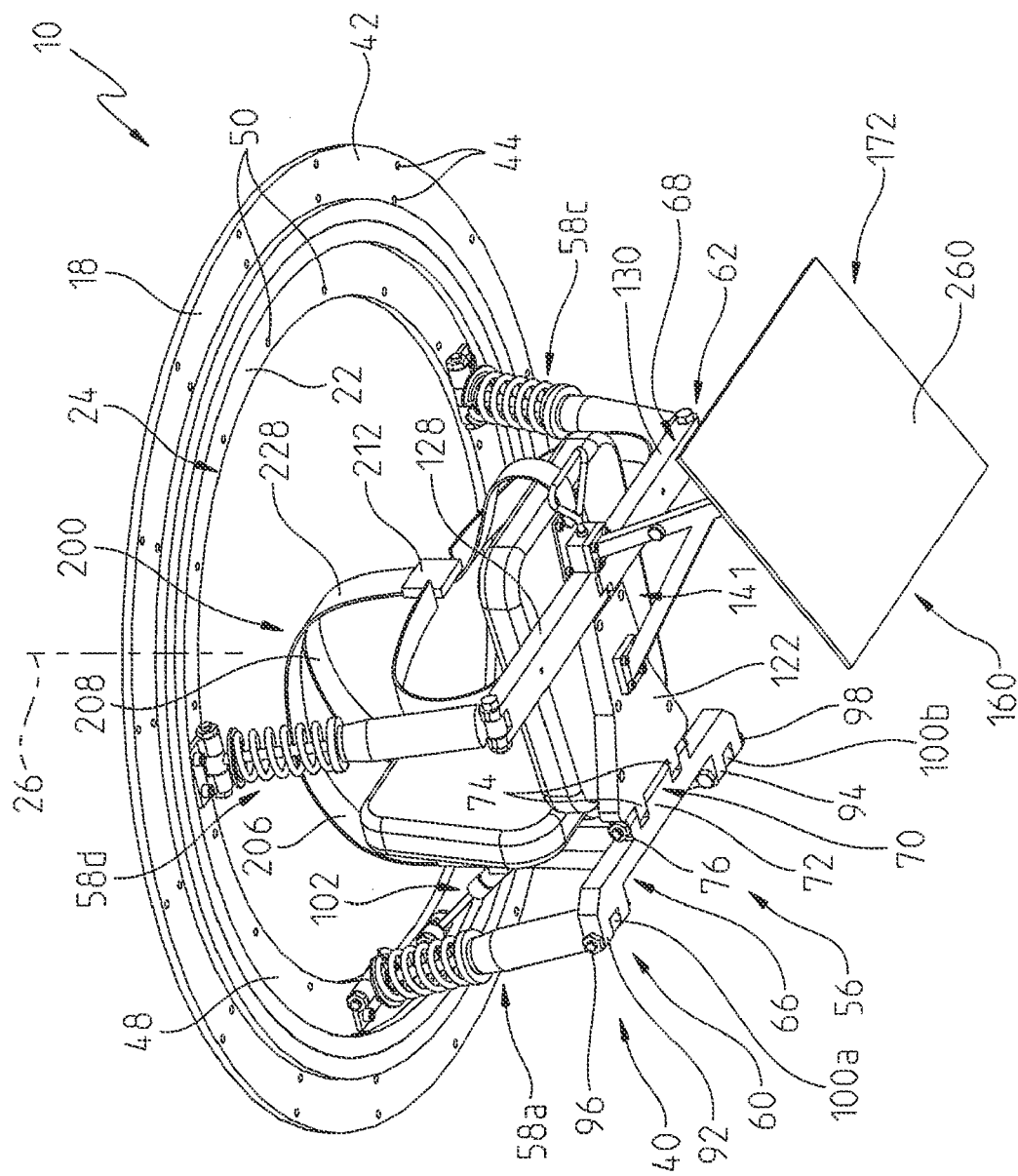
FIG. 3 is a front, bottom perspective view of the operator support assembly of FIG. 2.

Referring now to FIGS. 2 and 3, the operator seat assembly 40 illustratively includes a seat 56 suspended below the rotatable member 22 for rotation therewith. More particularly, a support operably couples the seat 56 to the rotatable member 22 and, illustratively, includes a plurality of support members 58. The seat 56 includes a rear seat portion or subassembly 60 coupled to a front seat portion or subassembly 62 (FIGS. 9A and 9B).

With further reference to FIGS. 2-7, the seat 56 includes a frame assembly 64 including a rear frame 66 of the rear seat portion 60, and a front frame 68 of the front seat portion 62. The rear frame 66 is pivotally coupled to the front frame 68 at a pivot coupling or hinge 70. The pivot coupling 70 is illustratively defined by a first or rear bracket member, illustratively a dual clevis 72, of the rear frame 66 pivotally coupled to a second or front bracket member, illustratively a pair of tabs 74, of the front frame 68 by way of a pin 76.

The rear frame 66 illustratively includes a lateral base 78 supporting the rear bracket member 72 and a pair of uprights 80 and 82. A seat back 84 is coupled to the uprights 80 and 82, illustratively through fasteners 86. In a further illustrative embodiment, the uprights 80 and 82 may include adjustable telescoping members (not shown) such that the relative position of the seat back 84 may be adjusted by the user. The seat back 84 may include a rigid support 88 secured to a cushion 90 (FIG. 7). In certain illustrative embodiments, an adjustable headrest (not shown) may be supported above the seat back 84.

Figure 5:
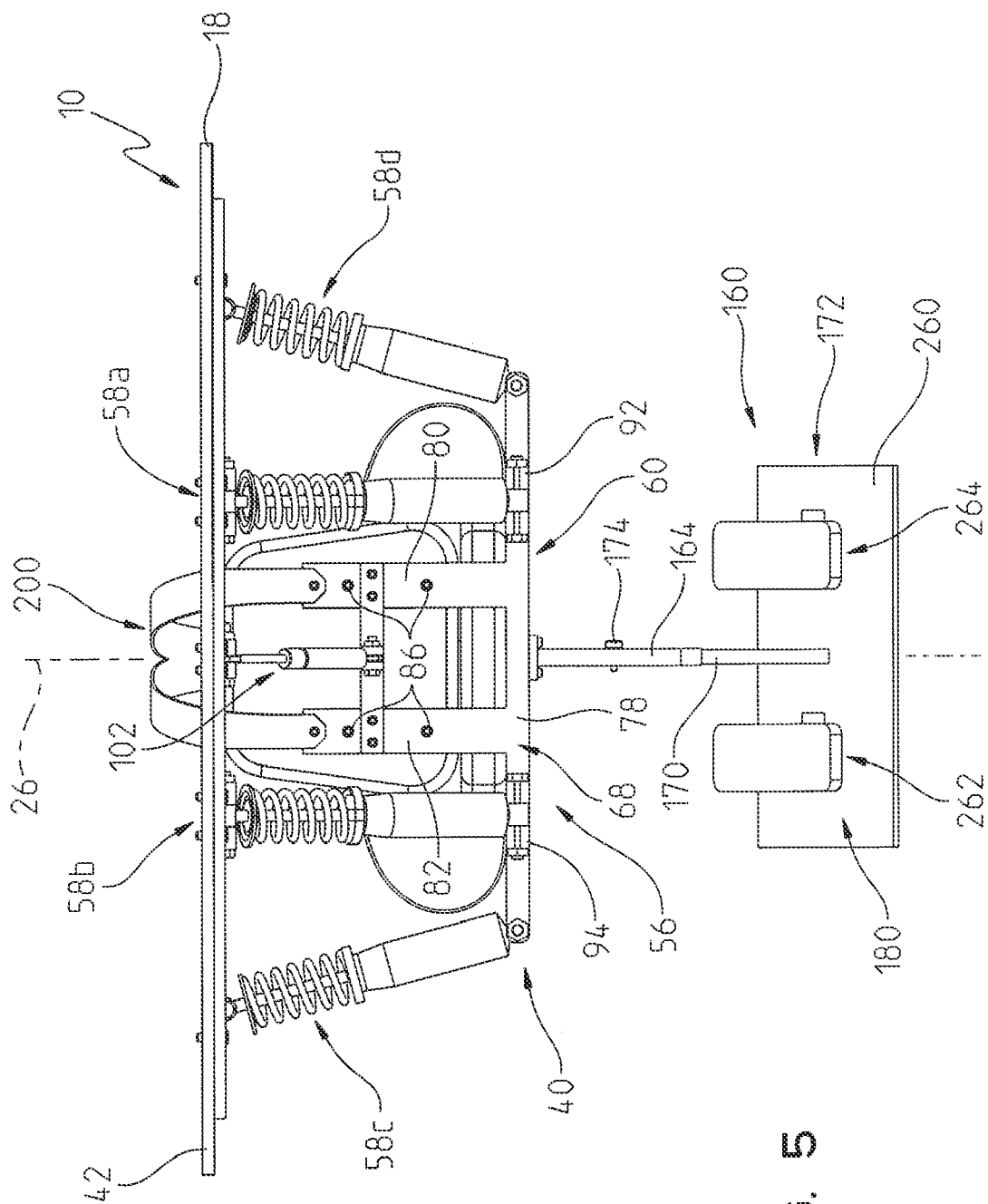
FIG. 5 is a rear view of the operator support assembly of FIG. 2.
Figure 6:
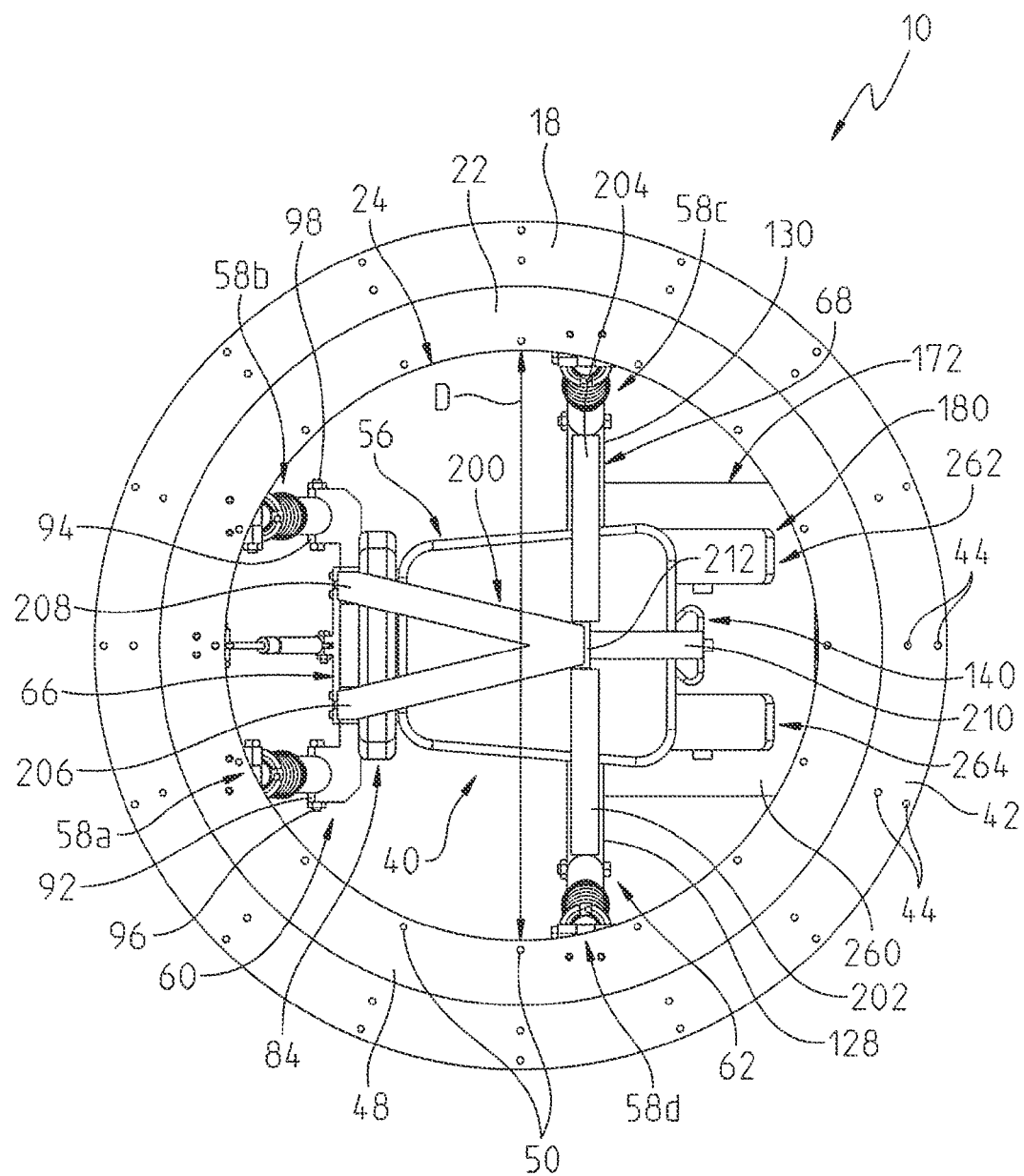
FIG. 6 is a top plan view of the operator support assembly of FIG. 2.
Figure 9A:
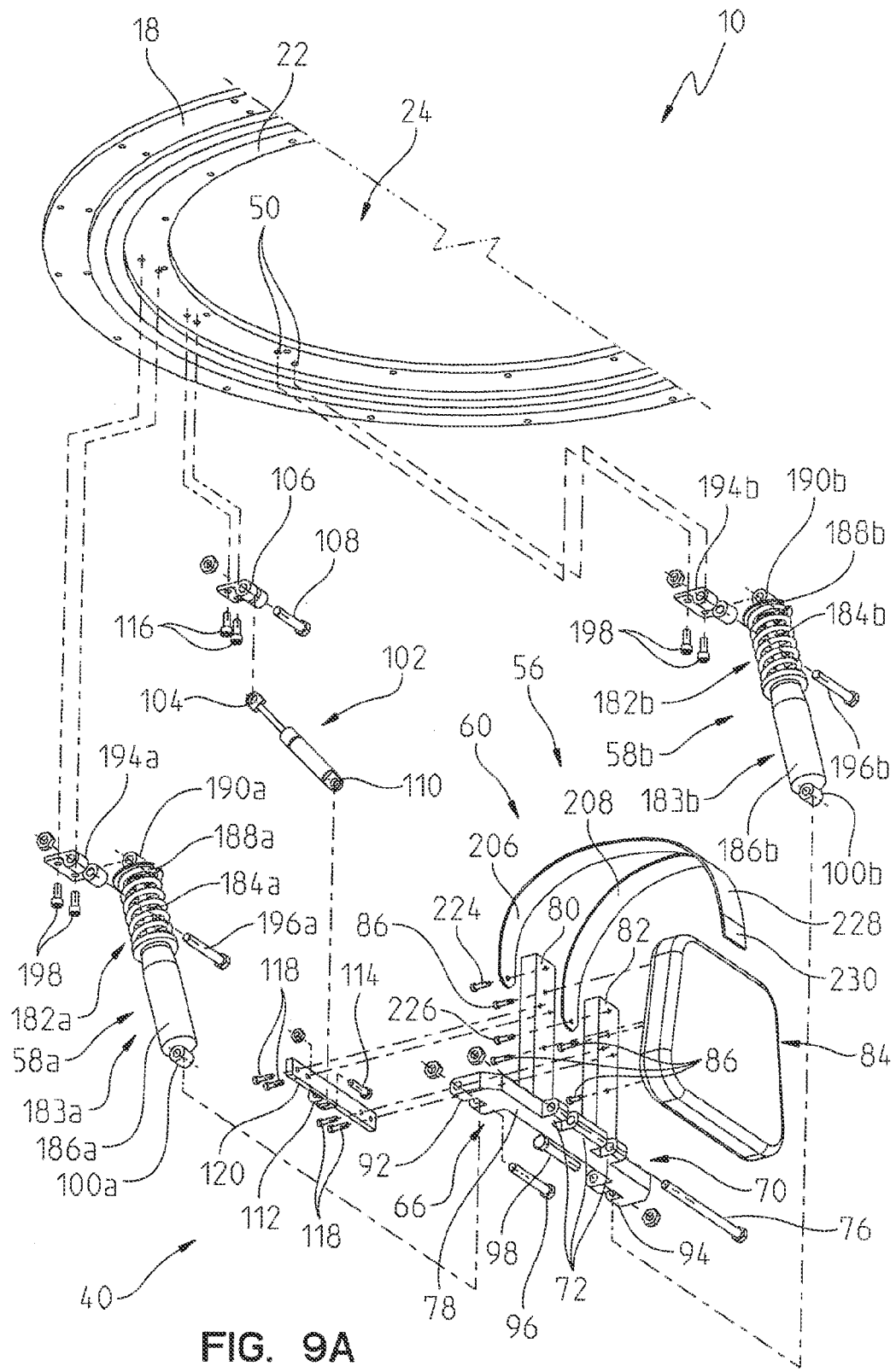
FIG. 9A is an exploded perspective view of an illustrative rear subassembly of the operator support assembly of FIG. 2.
Figure 9B:
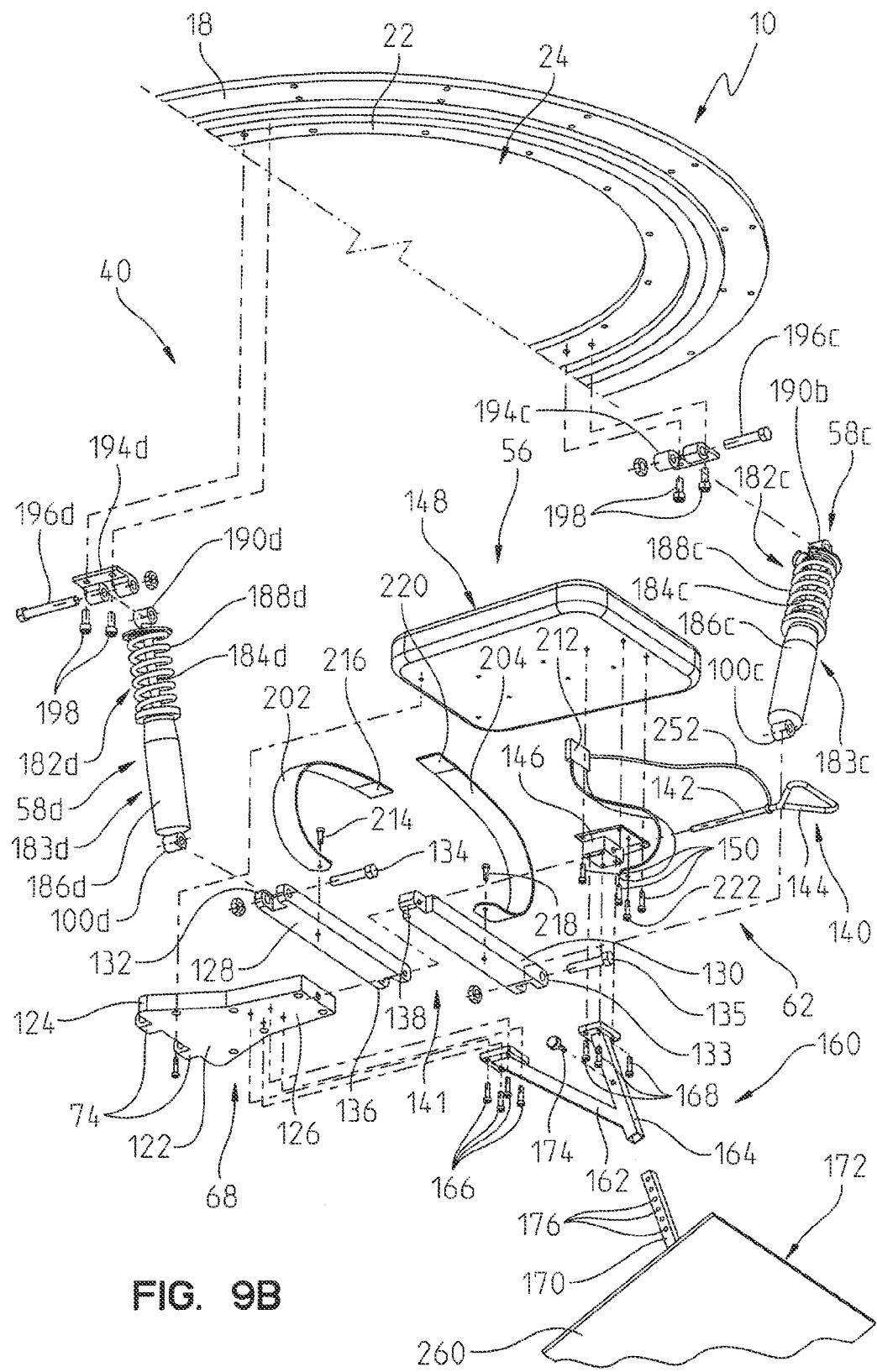
FIG. 9B is an exploded perspective view of an illustrative front subassembly of the operator support assembly of FIG. 2.

With reference to FIGS. 3, 5, and 9A, a pair of laterally spaced support brackets, illustratively first clevis 92 and second clevis 94, are illustratively positioned at opposing ends of the base 78. The brackets 92 and 94 are configured to receive pivot pins 96 and 98 to pivotally couple lower mounting members 100a and 100b of support members 58a and 58b to the rear frame 66.

A back support or coupler 102 illustratively extends between the rotatable member 22 and the rear frame 66. The back support 102 is illustratively flexible, and may comprise a gas shock having a tab 104 at an upper end coupled to a clevis 106 by a pivot pin 108, and having a tab 110 at a lower end coupled to a clevis 112 by a pivot pin 114. Clevis 106 is illustratively secured to the rotatable member 22 by fasteners 116 received within apertures 50. Clevis 112 is illustratively secured to the uprights 80 and 82 by fasteners 118 extending through a cross-member 120. The back support 102 is configured to maintain the seat back 84 in a generally vertical position while permitting limited relative movement between the seat back 84 and the rotatable member 22.

Figure 4:
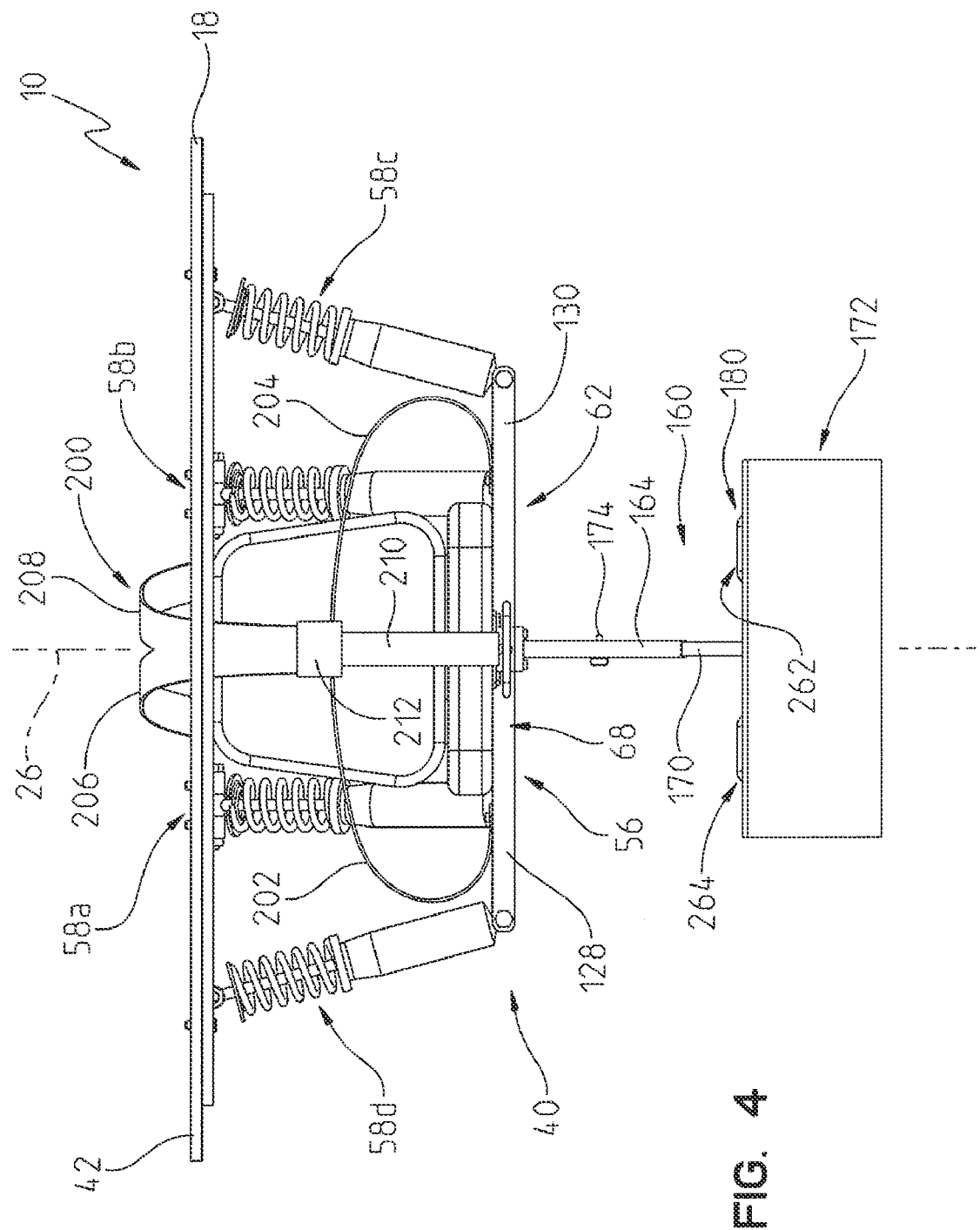
FIG. 4 is a front view of the operator support assembly of FIG. 2.

With reference to FIGS. 3, 4, and 9B, the front frame 68 illustratively includes a longitudinal base 122 having a rear portion 124 with an extended width and a front portion 126 extending longitudinally forward from the rear portion 124. The rear portion 124 supports the front bracket member 74, while the front portion 126 is releasably coupled to a pair of lateral supports, illustratively cross-members 128 and 130.

The lateral supports 128 and 130 each include a support bracket, illustratively clevis 132, 133, supported at a first or outer end and configured to receive pivot pins 134, 135 to pivotally couple lower mounting members 100d and 100c of supports 58d and 58c to the front frame 68. The second or inner end of the lateral support 128 includes a bracket or clevis 136, while the second or inner end of the lateral support 130 includes a cooperating bracket or tab 138. The tab 138 is received within the clevis 136, and is releasably secured to the clevis 136 together by a coupler 140 to define a releasable coupling 141. The coupler 140 illustratively includes a pin 142 secured to a handle 144. The pin 142 is releasably received within coaxial openings formed within the clevis 136 and tab 138. In certain illustrative embodiments, a receiver 146 is positioned forward of the supports 128 and 130 and includes an opening configured to receive the pin 142 of the coupler 140. The receiver 146 may be secured to a seat bottom 148 by a plurality of fasteners 150. Engagement between the pin 142 of coupler 140 and the receiver 146 is configured to prevent undesired relative pivoting or flexing between the supports 128 and 130.

The seat bottom 148 is supported in a substantially horizontal position by the supports 128 and 130 when coupled together at the releasable coupling 141. As further detailed herein, the supports 128 and 130 are connected to, but not fixed to the seat bottom 148. Instead, the seat bottom 148 rests upon, and is at least partially supported by, the supports 128 and 130.

With reference to FIG. 7, the seat bottom 148 illustratively includes a rigid base member 150, illustratively formed of aluminum plate, supporting a cushion 152. A ballistic resistant member 154 may be supported by the base member 150 below the cushion 152. Illustratively, the ballistic resistant member 154 may comprise a para-aramid synthetic fiber, such as KEVLAR®, configured to protect individual 28 supported by the seat 56 against blast pressure and fragmentation.

The cushion 90 of seat back 84, and the cushion 152 of seat bottom 148 are illustratively formed of a fire retardant foam. Alternatively, or in addition to the fire retardant foam, a protective cover or coating may encapsulate each respective cushion 90 and 152. In one illustrative embodiment, the protective cover comprises a fire retardant material, such as NOMEX®, a flame retardant meta-aramid material.

With reference to FIGS. 2, 5, 7, and 9B, a foot support assembly 160 is illustratively coupled to the seat bottom 148 through a pair of arms 162 and 164 oriented in a Y-shaped configuration. The foot support assembly 160 is illustratively configured to be ergonomically advantageous for the operator 28. In one illustrative embodiment, arm 162 is secured to base 122 by fasteners 166, and arm 164 is secured to receiver 146 by fasteners 168 (FIG. 9B). A telescoping member or key 170 is illustratively received within the arm 164 and is coupled to a footrest 172. A pin 174 may be received within any one of a plurality of apertures 176 (FIGS. 7 and 9B) of telescoping member 170 such that the vertical position of the footrest 172 relative to the seat bottom 148 may be adjusted. In certain illustrative embodiments, the angular orientation of the foot rest 172 relative to the seat bottom 148 may also be adjusted by providing a pivoting arm 164 and a length adjustable arm 162. As further detailed herein, an operator interface 180 may be supported by the footrest 172.

With further reference to FIGS. 9A and 9B, the support members 58 each include a shock absorbing device 182 to dampen shock impulse between the rotatable member 22 and the seat 56. The shock absorbing devices 182 may be of conventional design for absorbing or dissipating energy. For example, the devices 182 may comprise coil springs, leaf springs, pneumatic or gas shocks, hydraulic shocks, air bags, or various combinations thereof.

In the illustrative embodiment shown in FIGS. 9A and 9B, the shock absorbing devices 182 each comprise a gas shock 183 including a rod 184 supported by a body 186 and surrounded by a spring 188. More particularly, the rod 184 is supported for sliding movement within the body 186, illustratively a cylinder. As is known, the cylinder 186 is filled with a fluid, illustratively, a gas such as air. Illustratively, the springs 188 support the weight of the seat 56 and absorb shock by compressing and rebounding. The gas shocks 183 each dampen the oscillation of the respective spring 188 by pushing a piston (not shown) coupled to the rod 184 through a column of fluid received within the body 186. In one illustrative embodiment, the shock absorbing device 182 is a Roco Marzocchi rear suspension shock absorber available from Marzocchi USA of Valencia, Calif.

The shock absorbing devices 182 are independently coupled between the rotatable member 22 and the seat 56. Upper and lower mounting members 190 and 100 of each shock absorbing device 182 is pivotally coupled to the rotatable member 22 and the frame 64, respectively. The upper mounting members 190 are each pivotally coupled to a clevis 194 by a pivot pin 196. The clevis 194 is secured to the rotatable member 22 by fasteners 198. As further detailed above, the lower mounting members 100 are each pivotally coupled to one of the brackets 92, 94 of the rear frame 66 or to one of the support brackets 132, 133 of the front frame 68.

The shock absorbing devices 182 of the support members 58 are configured to collectively withstand a range of forces imported on the vehicle 12. In one illustrative embodiment, the shock absorbing devices 182 are configured to withstand forces encountered by the operator support assembly 10 during normal vehicle operation over rough terrain (about 3 g loading) up to forces caused by blast over pressurization (about 80 g loading) that may be caused by an explosion in proximity to the vehicle 12. The applied forces may be directed laterally, longitudinally, vertically, or in various combinations thereof. In the foregoing description of forces, g is recognized as the known unit of measure representing acceleration produced by gravity at the earth's surface (i.e., sea level)(for example, 3 g force or loading represents three times the force or loading at normal gravity or 1 g).

The shock absorbing devices 182 absorb vertical forces in the manner detailed above. Lateral and longitudinal forces may be similarly absorbed by the shock absorbing devices 182 as a result of the pivotable mounting thereof to the rotatable member 22 and to the frame 64 of seat 56. More particularly, the shock absorbing devices 182 illustratively include three degrees of freedom relative to the rotatable member 22, including rotation of the upper mounting member 190 about pivot pin 196, rotation of the rod 184 about is longitudinal axis relative to cylinder 186, and translational movement of the rod 184 relative to the cylinder 186. The mounting of the shock absorbing devices 182 facilitates the translation of lateral and longitudinal forces, by pivoting or swinging movement of the seat 56, into components acting substantially along the longitudinal axes of the rods 184 similar to vertical forces.

An operator restraint, such as a harness 200, is illustratively supported by the seat assembly 40. More particularly, the harness 200 may comprise a five point restraint including first and second straps or side belts 202 and 204, third and fourth shoulder straps 206 and 208, and a fifth center strap 210 coupled together at a releasable coupler or buckle 212. With reference to FIGS. 2, 3, and 9B, side belt 202 includes a first end secured to lateral support 128 through a fastener 214, and a second end having a tab 216 releasably coupled to buckle 212. Similarly, side belt 204 includes a first end secured to lateral support 130 through a fastener 218, and a second end having a tab 220 releasably coupled to buckle 212. The center strap 210 includes a first end secured to the seat bottom 148 through a fastener 222 engaging the receiver 146, and a second end fixed to the buckle 212.

With reference to FIGS. 2, 3, and 9A, shoulder strap 206 includes a first end secured to upright 80 of the rear frame 66 through a fastener 224. Similarly, shoulder strap 208 includes a first end secured to upright 82 of the rear frame 66 through a fastener 226. Second ends of the shoulder straps 206 and 208 are secured together, illustratively through stitching, at a combined portion 228 including a tab 230 which may be releasably coupled to buckle 212.

In one illustrative embodiment, the harness 200 may comprise a five point Latch and Link Restraint available from Simpson Performance Products of New Braunfels, Tex. Other types of operator restraints may be substituted for the harness 200, including four point and six point restraints.

Figure 10:
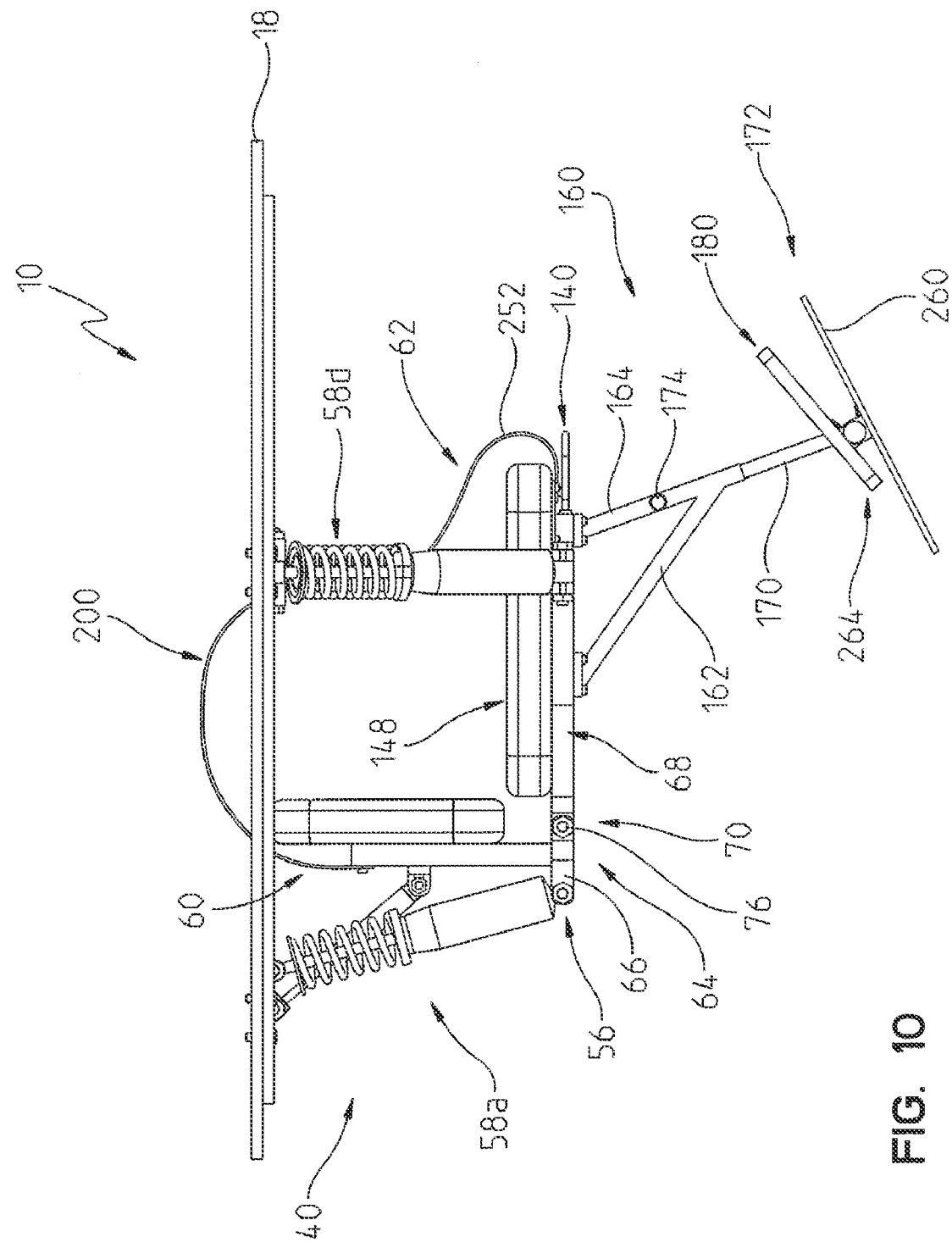
FIG. 10 is side elevational view of the operator support assembly of FIG. 2, with the seat assembly in a locked support mode of operation.
Figure 11:
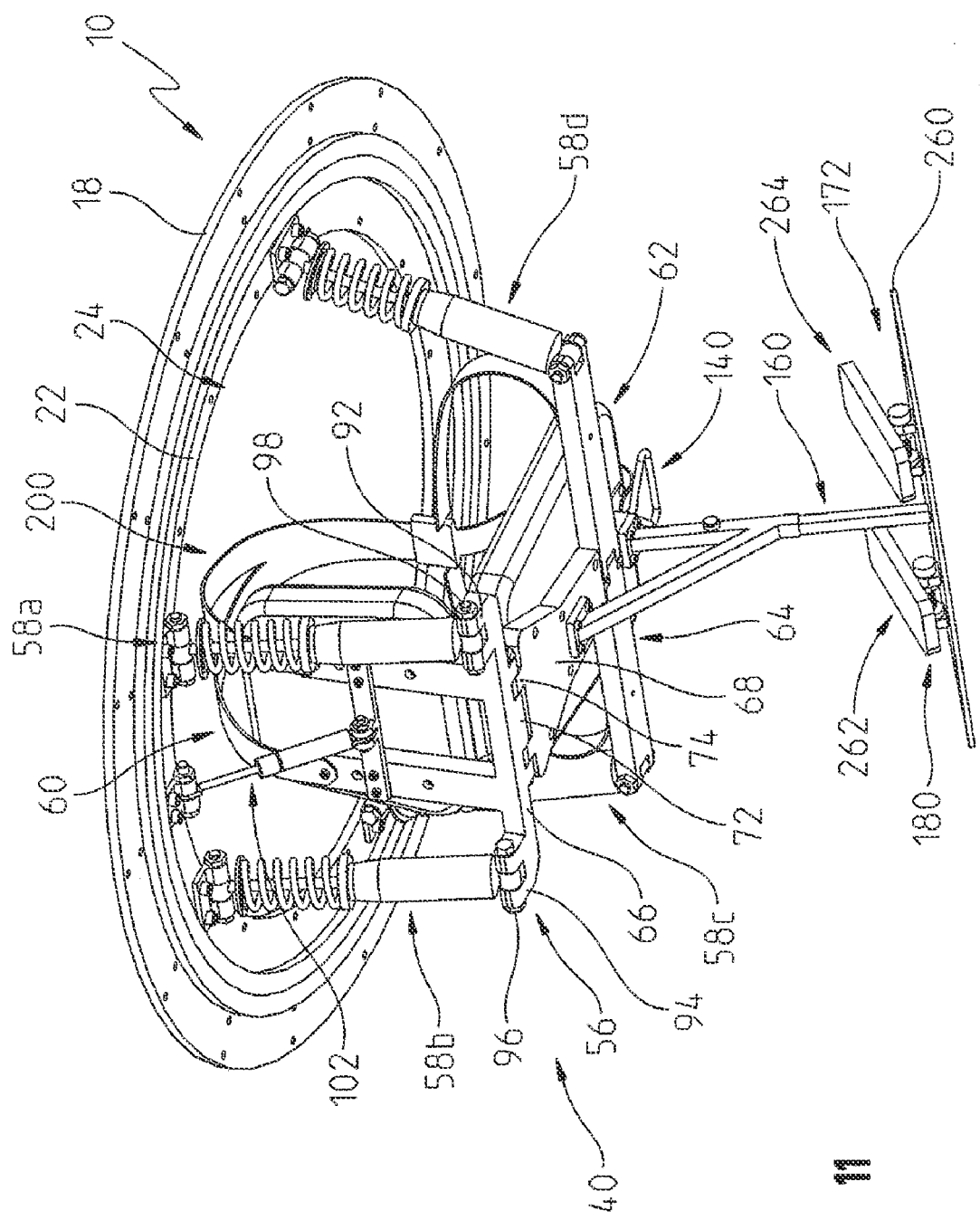
FIG. 11 is a rear, bottom perspective view of the operator support assembly of FIG. 2, with the seat assembly in the locked support mode of operation.
Figure 12:
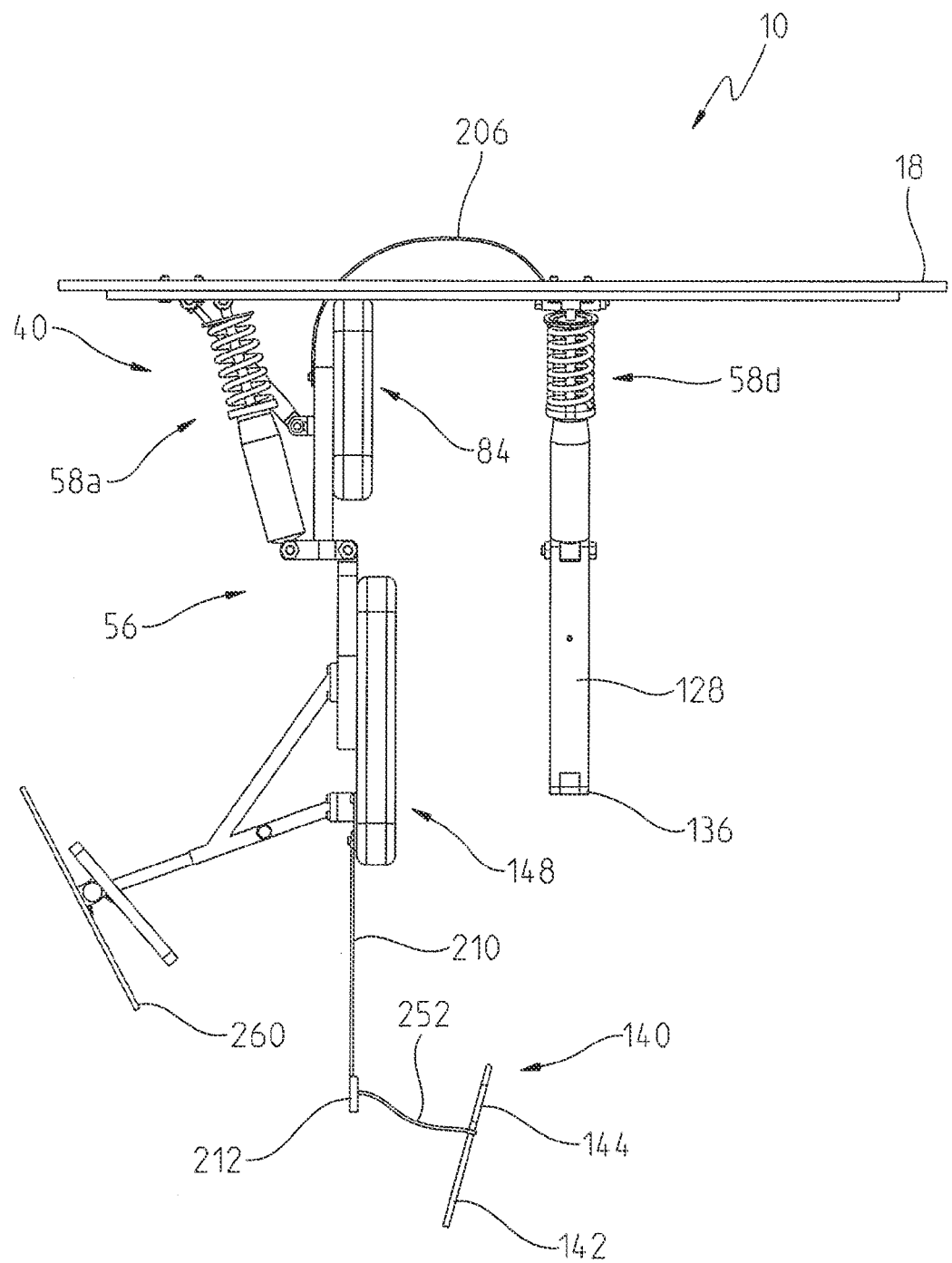
FIG. 12 is a side elevational view similar to FIG. 10, with the seat assembly in a released mode of operation.
Figure 13:
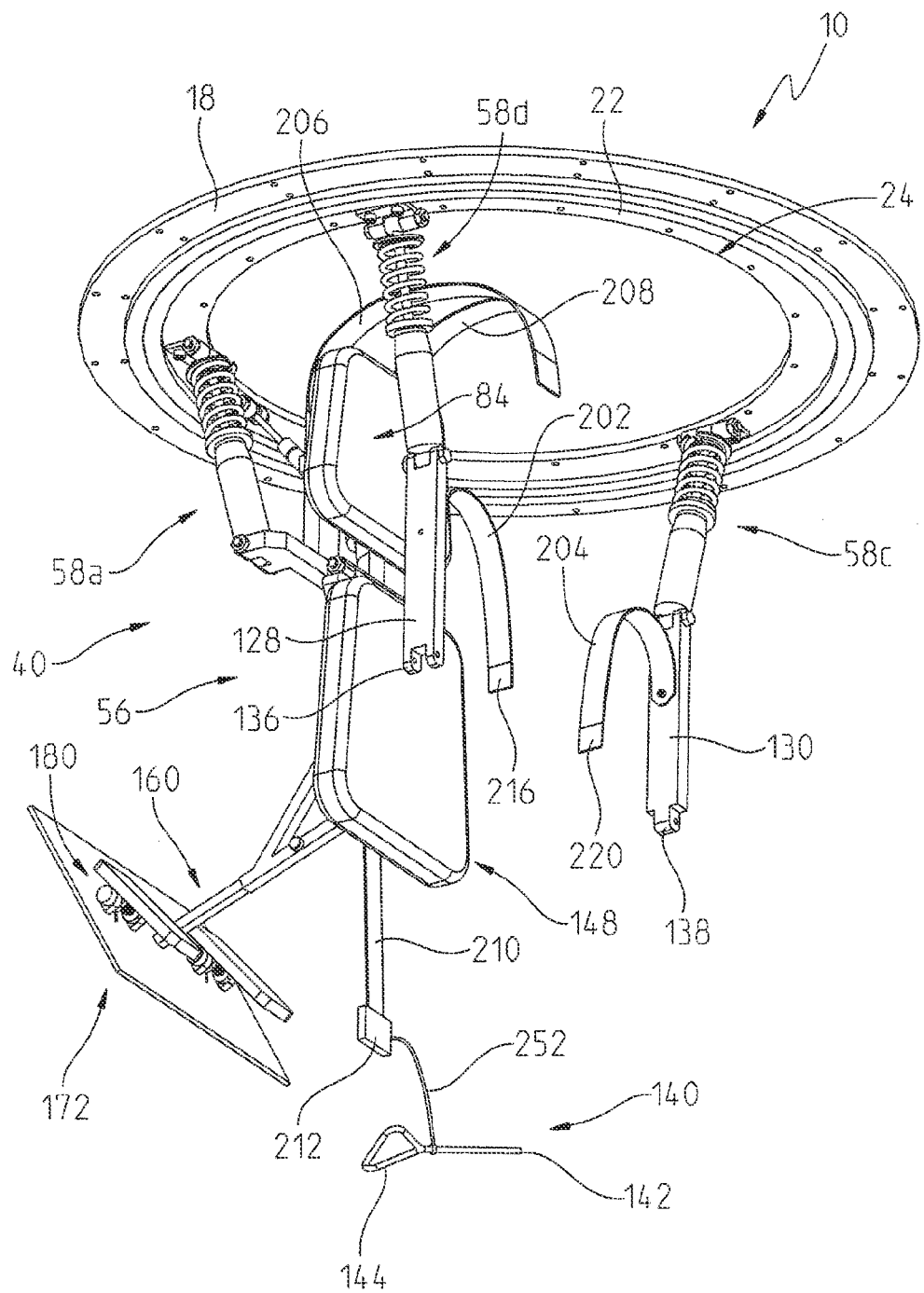
FIG. 13 is a front, bottom perspective view of the operator support assembly similar to FIG. 3, showing the seat assembly in the released mode of operation.
Figure 14:
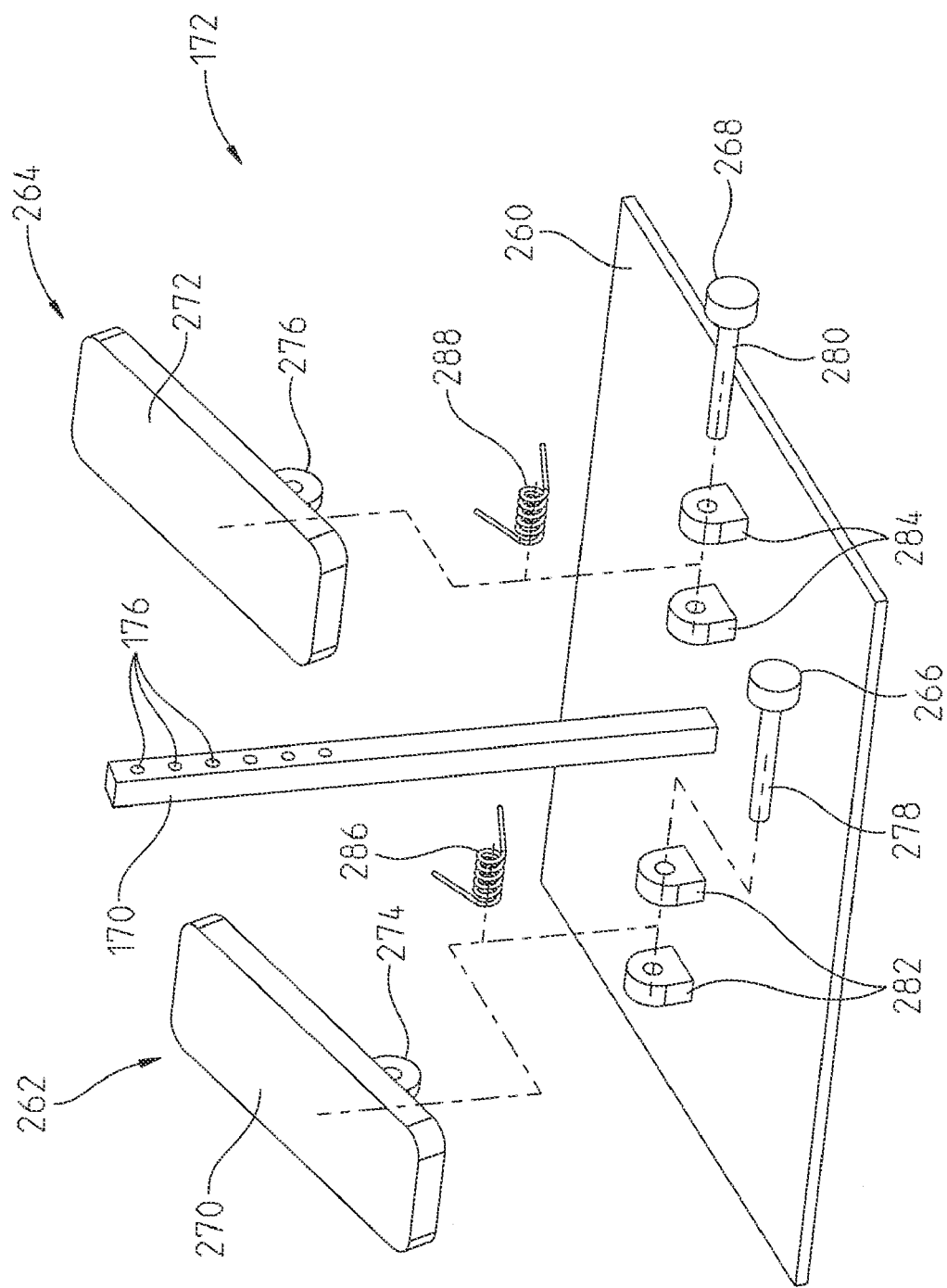
FIG. 14 is an exploded perspective view of the foot control assembly of FIG. 2.

A quick release mechanism 250 is operably coupled to the seat 56 and includes an operator interface, illustratively handle 144, configured to release the seat 56 from the fixed support mode of operation shown in FIGS. 10 and 11 to the released drop down mode of operation of FIGS. 12 and 13. As detailed above, the handle 144 is operably coupled to pin 142 which passes through brackets 136 and 138 of lateral supports 128 and 130 which support the seat bottom 148. More particularly, the pin 142 releasably couples together the left and right lateral supports 128 and 130 and, illustratively, the receiver 146. Pulling the pin 142 axially away from the seat bottom 148 causes the pin 142 to disengage from the left and right supports 128 and 130. In response to gravity, the supports 128 and 130 then pivot downwardly about pivot pins 134c and 134d of the supports 58c and 58d. The seat bottom 148 then drops down by pivoting about hinge 70 of the rear frame 66, allowing the operator 28 to quickly drop below the stationary member 18 and base 20. The rear frame 66 and base 122 of front frame 68 of seat 56 remain supported by the rotatable member 22 through support members 58a and 58b. Similarly, the lateral supports 128 and 130 remain supported by support members 58c and 58d.

The handle 144 of the quick release mechanism 250 is operably coupled to the buckle 212 of the harness 200, illustratively through a cable or tether 252. As such, when the handle 144 is pulled axially away from the seat bottom 148, the cable 252 likewise causes the buckle 212 to release the straps 202, 204, 206, 208, 210 of the harness 200 from each other, thereby releasing the user from the seat 56. More particularly, when the seat bottom 148 drops downwardly, the harness 200 simultaneously releases such that the operator is free to drop down away from the seat 56.

With reference to FIGS. 5, 9B, and 14-15C, the footrest 172 illustratively includes a base 260 coupled to key 170 and supporting the operator interface 180. The operator interface 180 may comprise a pair of foot pedals 262 and 264 operably coupled to electrical switches, such as rotary contacts or potentiometers 266 and 268, wherein depressing the pedals 262 and 264 cause a signal to be transmitted to the controller 54 (FIG. 8). It should be appreciated that other operator interfaces may be substituted for the pedals 262 and 264, such as push buttons or pressure sensors.

Figure 15A:
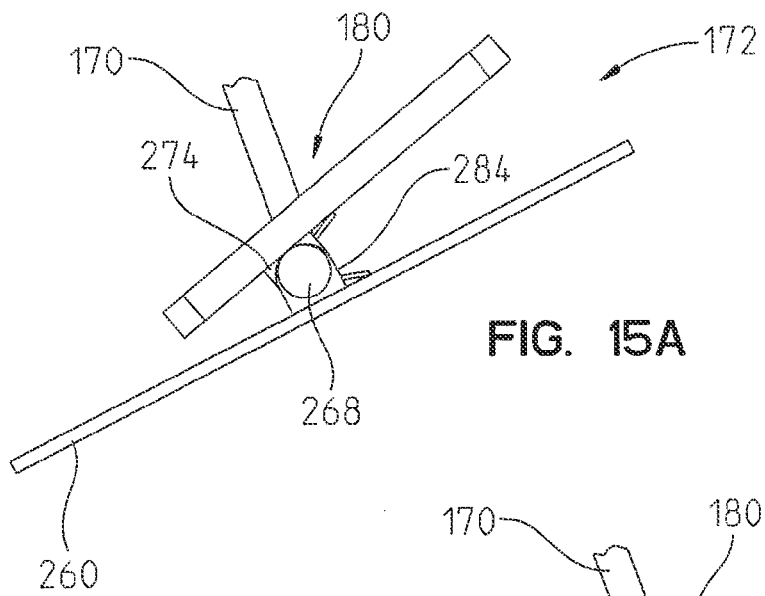
FIG. 15A is a side elevational view of the foot control assembly of FIG. 14, showing the right foot pedal in a raised position.
Figure 15B:
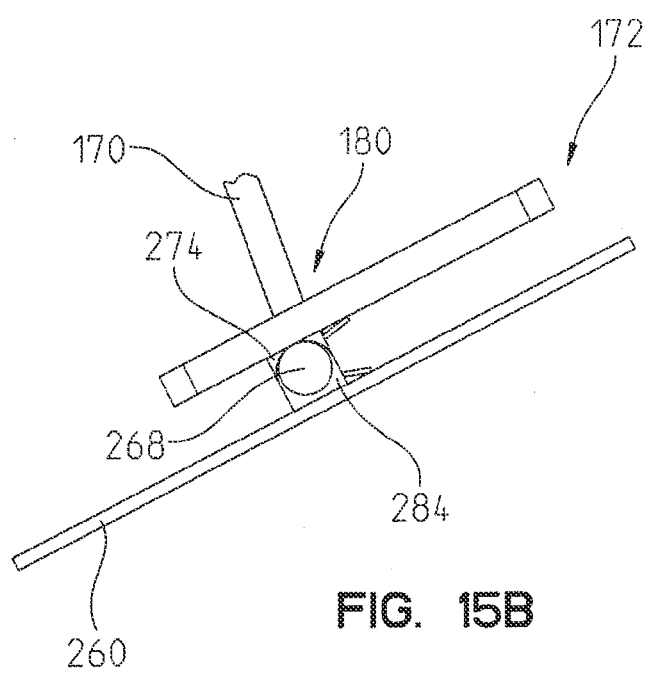
FIG. 15B is a side elevational view similar to FIG. 15A, showing the right foot pedal in an intermediate depressed position.
Figure 15C:
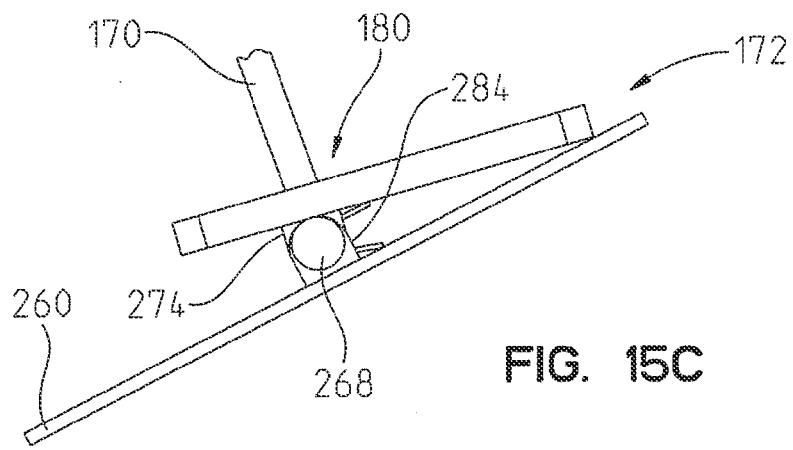
FIG. 15C is a side elevational view similar to FIG. 15A, showing the right foot pedal in a fully depressed position.

Illustratively, each pedal 262, 264 includes a lever 270, 272 configured to be depressed by the foot of the operator 28 (clockwise in FIGS. 15A-15C). Each lever 270, 272 includes a downwardly extending tab 274, 276 pivotally coupled by a pivot pin 278, 280 to a bracket or clevis 282, 284 supported by the base 260. A spring 286, 288 biases each lever 270, 272 upwardly away from the base 260 (counterclockwise in FIGS. 15A-15C).

In one illustrative embodiment, the operator interface 180 includes left pedal 262 and right pedal 264. Depressing the left pedal 262 causes the controller 54 to drive actuator 32 for moving the rotatable member 22 in a counterclockwise direction, and depressing the right pedal 64 causes the controller 54 to drive the actuator 32 to rotate the rotatable member 22 in a clockwise direction. Illustratively, the degree of pivot of the respective lever 270, 272 may vary the signal transmitted by the potentiometer 266, 268 to the controller 54. In response, the controller 54 may vary the rotational speed at which the actuator 32 drives the rotatable member 22. For example, in the raised position of FIG. 15A the actuator 32 may by inactive such that the rotatable member 22 is not driven in rotation, in the partially depressed position of FIG. 15B the actuator 32 may drive the rotatable member 22 at a slow speed, while in the fully depressed position of FIG. 15C the actuator 32 may drive the rotatable member 22 at a fast speed.

In a further illustrative embodiment of the operator support assembly 10, the shock absorbing devices 182 may be part of an active system. More particularly, the shock absorbing devices 182 may comprise air bags which are inertially activated through sensors, such as through accelerometers which are set to trigger based on relatively high g movements (vertical, lateral, and/or longitudinal). The trigger may be based upon the force imparted on the base 20, to which the seat 56 is operably coupled, by explosions in proximity thereto (typically between 40 to 80 g force). The shock absorbing devices 182 may be inflatable and/or retractable based on sensors and/or commands from a user interface. An override may be provided for instantly deflating the shock absorbing devices 182 based upon input from an emergency switch, which is accessible to the operator as well as rescue personnel. In some illustrative embodiments, activation of the emergency switch may also reposition the seat 56, including head rest, and release the operator restraint 200 to facilitate positioning and subsequent exiting of the operator 28 from the vehicle 12.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An operator support assembly comprising:
a first member;
a second member supported for rotation relative to the first member, the second member defining a center opening;
a seat bottom suspended below the second member;
a support coupling the seat bottom to the second member, wherein the support includes a first support member coupled to the seat bottom at a first coupling and including a first shock absorbing device, a second support member coupled to the seat bottom at a second coupling and including a second shock absorbing device, and a third support member coupled to the seat bottom at a third coupling and including a third shock absorbing device;
a quick release mechanism operably coupled to the first coupling and the second coupling, wherein activation of the quick release mechanism causes the first coupling to disconnect the first support member from the seat bottom and causes the second coupling to disconnect the second support member from the seat bottom, wherein the seat bottom pivots downwardly about the third coupling;

an occupant restraint including a first strap, a second strap, and a coupler selectively connecting the first strap and the second strap, wherein the coupler releases the first strap from the second strap upon activation of the quick release mechanism;

a footrest supported below the seat bottom; and a backrest supported above the seat bottom, the seat bottom pivotable relative to the backrest;

wherein the seat bottom includes a ballistic resistant layer.

2. The operator support assembly of claim 1, wherein the first member comprises a stationary outer ring, and the second member comprises a rotatable inner ring.

3. The operator support assembly of claim 1, wherein the occupant restraint further comprises a third strap and a fourth strap, the coupler selectively connecting the third strap and the fourth strap, the coupler releasing the third strap from the fourth strap, upon activation of the quick release mechanism, the first and second straps comprise side belts and the third and fourth straps comprise shoulder belts.

4. The operator support assembly of claim 1, wherein the seat bottom includes a rigid base member.

5. The operator support assembly of claim 4, wherein the seat bottom includes a fire retardant material.

6. The operator support assembly of claim 1, further comprising an adjustable support coupling the footrest to the seat bottom, the footrest being movable relative to the seat bottom.

7. The operator support assembly of claim 1, further comprising an actuator configured to drive the second member in rotation.

8. The operator support assembly of claim 1, wherein the shock absorbing device comprises a gas operated shock absorber.

9. The operator support assembly of claim 8, wherein the shock absorbing device comprises a gas operated coil-over spring shock absorber.

10. The operator support assembly of claim 1, wherein the center opening defined by the second member has an inner diameter of at least 26 inches to provide clearance for the torso of an individual supported on the seat bottom.

11. The operator support assembly of claim 1, wherein the first member is coupled to a vehicle platform.

12. The operator support assembly of claim 11, wherein the second member is configured to support at least one of a turret, a crane, an antenna, a camera, a ladder, and a water cannon.

13. The operator support assembly of claim 1, wherein the shock absorbing device is configured to absorb at least an 80 g force.

14. An operator support assembly as in claim 1, further comprising a shock absorbing device to dampen shock impulse between the backrest and the second member, the shock absorbing device being fixed at an angle less than 90 degrees from the plane parallel to the seat bottom, allowing for the dampening of both lateral and vertical forces.

15. A rotatable operator support assembly comprising:
a vehicle platform;
a rotatable member supported for rotation relative to the vehicle platform, the rotatable member defining a center opening;
a seat bottom suspended below the rotatable member;
a support coupling the seat bottom to the rotatable member, the support including a first support member and a second support member, a releasable coupling connecting the first support member to the seat bottom, and a pivotable coupling connecting the second support member to the seat bottom;

an occupant restraint including a first strap, a second strap, and a coupler selectively connecting the first strap and the second strap, wherein the coupler releases the first strap from the second strap upon activation of a user interface;

a backrest supported above the seat bottom, and a flexible coupler extending between the rotatable member and the backrest;

a footrest supported below the seat bottom; and a quick release mechanism including the user interface operably coupled to the releasable coupling, wherein activation of the user interface causes the quick release mechanism to disconnect the releasable coupling from the seat bottom such that the seat bottom pivots downwardly about the pivotable coupling.

16. The rotatable operator support assembly of claim 15, wherein at least one of the first support member and the second support member includes a shock absorbing device.

17. The rotatable operator support assembly of claim 15, wherein the releasable coupling includes a pin coupled to the handle and configured to be received within an opening of the releasable coupling.

18. The rotatable operator support assembly of claim 15, wherein the occupant restraint further comprises a third strap and a fourth strap, the coupler selectively connecting the third strap and the fourth strap, the coupler releasing the third strap from the fourth strap, upon activation of the quick release mechanism, the first and second straps comprise side belts and the third and fourth straps comprise shoulder belts.

19. The rotatable operator support assembly of claim 15, wherein the seat bottom includes a rigid base member.

20. The rotatable operator support assembly of claim 19, wherein the base member of the seat bottom includes a ballistic resistant layer.

21. The rotatable operator support assembly of claim 15, further comprising an adjustable support coupling the footrest to the seat bottom, the footrest being movable relative to the seat bottom.

22. The rotatable operator support assembly of claim 21, further comprising an actuator configured to drive the rotatable member in rotation.

23. The rotatable operator support assembly of claim 15, wherein the first support member and the second support member each includes a gas operated shock absorber.

24. The rotatable operator support assembly of claim 15, wherein the center opening defined by the rotatable member has an inner diameter of at least 26 inches to provide clearance for an individual supported on the seat bottom.

25. The rotatable operator support assembly of claim 15, wherein the rotatable member is configured to support one of a turret, a crane, an antenna, a camera, a ladder, and a water cannon.

26. A rotatable operator support assembly as in claim 15, further comprising a shock absorbing device to dampen shock impulse between the backrest and rotatable member, the shock absorbing device being fixed at an angle less than 90 degrees from the plane parallel to the seat bottom, allowing for the dampening of both lateral and vertical forces.

27. A method of supporting an individual within a turret, the method comprising the steps of:
providing a rotatable member;
suspending a seat bottom from the rotatable member, the seat bottom including a rigid base member;

absorbing shock between the rotatable member and the seat bottom;

providing an input to a release mechanism for causing the seat bottom to pivot downwardly;

releasing an occupant restraint in response to the step of providing input to the release mechanism;

providing a footrest, and adjusting the position of the footrest relative to the seat bottom; and rotating simultaneously the rotatable member and the seat bottom;

providing an actuator to drive the rotatable member in rotation;

wherein the step of providing an input to a release mechanism includes the step of pulling a pin from a release coupling.

28. The method of claim 27, further comprising the step of providing the seat bottom with a ballistic resistant layer.

29. The method of claim 27, further comprising the step of providing a backrest supported above the seat bottom, the seat bottom pivotable relative to the backrest.

30. The method of claim 29, further comprising the step of absorbing a substantially lateral force between the rotatable member and the seat back.

31. An operator support assembly comprising:
a first member;
a second member rotatably coupled and supported for rotation relative to the first member, the second member defining a center opening;
a seat bottom suspended below the second member;
a seat back section;
a quick release interface section comprising a quick release interface structure;
a first and second shock absorbing structure;
a frame assembly comprising a front frame portion and a rear frame portion, said front and rear frame portions are coupled with a pivot coupling or hinge, said frame assembly further comprises a seat back frame section which is coupled to said rear frame portion and said seat back, said seat back frame positions said seat back at approximately a 90 to 120 degree orientation to said seat back, said seat bottom is further coupled to said second member with a lateral back support member at an angle that is less than 90 degrees to said second member, said front frame portion further comprises a coupling point attached on a bottom section of said front frame portion and is adapted to releasably receive, engage and interface with said quick release interface structure, said first and second shock absorbing structure are respectively coupled on one end to opposing sides of said rear frame portion and on the other end to said second member;
a first and second lateral member, said first and second lateral member are adapted to receive said interface structure and thereby be releasable locked in orientation with each other at one end of said first and second lateral members, wherein said first and second lateral members releasably support said front frame portion when said quick release interface structure is in a locking mode;
a third and fourth shock absorbing structure each coupled to said second member at one end section and coupled to said first and second lateral member on an opposing section, said first and second shock absorbing members are positioned so they are in a sloping or lateral orientation to said second member when said first and second lateral members are locked in orientation with each other with said quick release interface structure;
an occupant restraint attached to said frame assembly including a first strap, a second strap, and a coupler selectively connecting the first strap and the second strap, wherein the coupler releases the first strap from the second strap upon activation of the quick release mechanism.

32. An operator support as in claim 31, further comprising a footrest supported below the seat bottom.

33. An operator support as in claim 31, wherein the seat bottom includes a ballistic resistant layer.

34. An operator support of claim 31, wherein the first member comprises a stationary outer ring, and the second member comprises a rotatable inner ring.

35. An operator support as in claim 31, further comprising an adjustable support coupling the footrest to the front frame portion, the footrest being selectively movable relative to the seat bottom.

36. An operator support as in claim 31, further comprising an actuator configured to drive the second member in rotation.

37. An operator support as in claim 31, wherein first, second, third, and fourth shock absorbing structures comprises a gas operated shock absorber.

38. An operator support as in claim 37, wherein said gas operated shock absorber also comprises a spring structure.

39. An operator support as in claim 37, wherein the first member is coupled to a vehicle platform.

* * * * *